US007997422B2

(12) United States Patent
Kraft et al.

(10) Patent No.: US 7,997,422 B2
(45) Date of Patent: Aug. 16, 2011

(54) FILTER, IN PARTICULAR A FUEL FILTER

(75) Inventors: Gunther Kraft, Ludwigsburg (DE);
Andre Rösgen, Remshalden (DE); Peter Müller, Saarbrücken (DE)

(73) Assignee: Mann+Hummel GmbH, Ludwigburg (DE)

( * ) Notice: Subject to any disclaimer, the term of this patent is extended or adjusted under 35 U.S.C. 154(b) by 548 days.

(21) Appl. No.: 12/034,018

(22) Filed: Feb. 20, 2008

(65) Prior Publication Data

US 2008/0203010 A1    Aug. 28, 2008

(30) Foreign Application Priority Data

Feb. 22, 2007  (DE) .................... 20 2007 002 785 U

(51) Int. Cl.
*B01D 35/30* (2006.01)
*B01D 35/34* (2006.01)
*B01D 27/00* (2006.01)
*B01D 29/00* (2006.01)

(52) U.S. Cl. ......... 210/455; 210/435; 210/451; 210/450

(58) Field of Classification Search ................ 220/4.13, 220/4.14, 62.22
See application file for complete search history.

(56) References Cited

U.S. PATENT DOCUMENTS

| 5,382,359 | A  | * | 1/1995 | Brandt ........................... 210/243 |
| 5,798,048 | A  |   | 8/1998 | Ries |
| 6,171,492 | B1 |   | 1/2001 | Hedgepeth et al. |
| 6,589,420 | B1 | * | 7/2003 | Mathew ......................... 210/243 |
| 7,267,768 | B2 |   | 9/2007 | Kolczyk et al. |
| 7,662,284 | B2 | * | 2/2010 | Greco et al. ................... 210/234 |
| 2002/0125188 | A1 | * | 9/2002 | Hacker et al. ................. 210/443 |
| 2003/0037831 | A1 | * | 2/2003 | Nakamura et al. ............ 138/177 |
| 2003/0146143 | A1 | * | 8/2003 | Roll et al. ..................... 210/232 |
| 2005/0173433 | A1 | * | 8/2005 | Spahr .......................... 220/62.22 |

FOREIGN PATENT DOCUMENTS

| DE | 19507485 A1 | 9/1996 |
| DE | 10144698 A  | 3/2003 |
| EP | 0484710 A   | 5/1992 |
| EP | 0537521 A   | 4/1993 |
| EP | 0742096 B1  | 11/1996 |
| EP | 0745763 A   | 12/1996 |
| EP | 1338319 A   | 8/2003 |
| EP | 1338319 A1  | 8/2003 |
| EP | 1568531 A2  | 8/2005 |

* cited by examiner

*Primary Examiner* — Benjamin Kurtz

(57) ABSTRACT

A filter has a housing with cylindrical wall having a first end face and a second end face. The housing has an end wall that closes of the first end face. A filter insert is arranged in the housing. A lid is attached to the cylindrical wall and closes off the second end face. The housing has two layers of different plastic materials, wherein the different plastic materials have different ductility and in particular different hardness. The cylindrical wall has elements that provide a positive-locking connection of the two layers in the axial direction of the housing.

14 Claims, 1 Drawing Sheet

FILTER, IN PARTICULAR A FUEL FILTER

BACKGROUND OF THE INVENTION

The invention relates to a filter, in particular fuel filter, comprising a filter insert arranged in a housing, wherein the housing comprises a substantially cylindrical wall and a wall arranged on one end face of the cylindrical wall, wherein the other end face is closed off by a lid.

The housing and the lid of filters, in particular fuel filters, are usually made from sheet metal, die cast aluminum, extruded aluminum, or plastic (synthetic) material. When made from sheet metal, the filter housing has a satisfactory crash safety but the manufacturing costs are very high so that such filter housings are not competitive on the market. In the case of materials such as die cast aluminum, extruded aluminum and plastic material, the crash safety is not satisfactory because these materials are brittle and do not deform so that they break in a crash.

SUMMARY OF THE INVENTION

It is therefore an object of the present invention to provide a filter of the aforementioned kind that is inexpensive and is very safe in a crash situation.

In accordance with the present invention, this is achieved in that the housing is comprised of two layers of different plastic materials wherein the plastic materials have different ductility.

By configuring the housing so as to be comprised of two layers of plastic material having different ductility, the functions, i.e., satisfactory stability on the one hand and satisfactory deformability in a crash situation on the other hand, are assigned to one of the two layers, respectively. Ductility in this context refers to reshaping of materials wherein one of the materials is more brittle and the other more elastic than the other, respectively. The temperatures to which the housing is exposed during filtration and mechanical loads such as pressure and vibrations are absorbed by the layer of greater hardness so that in this way fatigue strength and resistance are provided. After a crash, only short-term resistance and durability are required that are provided by the layer of soft plastic material. After a crash the filter must be exchanged in any case.

The plastic (synthetic) materials of the layers, respectively, have different hardness; this is generally the case in materials of different ductility but exceptions may occur.

For producing the filter with a housing comprised of two layers, injection molding techniques are suitable. In this connection it is possible to first manufacture one layer and to use this layer as an insertion part in a mold into which mold the material for the second layer is then injected. Expedient is also a two-component injection molding process because in this case only one mold is required. Alternatively, a blow molding technique can be utilized; it is then possible to produce only the inner layer in this way or to produce first the outer layer and subsequently the inner layer in a multi-component blow molding process.

According to a preferred embodiment of the present invention, the two plastic layers forming the housing contact one another directly. In order to secure the two layers relative to the axial direction of the housing in their relative position to one another, it is proposed that elements for a positive-locking connection of the two layers in the axial direction of the housing are provided in the area of the cylindrical wall. For this purpose, it is expedient that on one layer at least one projection is formed that engages a recess of the other layer. Particularly when manufacturing the filter housing in a multi-component injection molding processor multi-component blow molding process it is possible to provide the projection as a radial collar that is positioned in a radial groove of the other layer.

According to another embodiment of the invention, the inner layer is made of a brittle or hard plastic material and the outer layer is made of an elastic or soft plastic material. In this connection, the inner layer can be polyamide or POM (polyoxymethylene) and the outer layer is comprised of a thermoplastic elastomer material. The thermoplastic elastomer material can be, for example, polypropylene plus ethylene/propylene/diene monomer terpolymer (PP+EPDM) or thermoplastic vulcanized materials.

According to an alternative embodiment, the inner layer is comprised of an elastomer or soft plastic material and the outer layer is made of brittle or hard plastic material. The plastic material for the inner layer can be polyethylene, polyamide or POM wherein this layer is preferably fuel-resistant. The outer layer is comprised preferably of thermoplastic material, in particular polypropylene with 20% talcum. Inasmuch as the inner layer is comprised of the soft plastic material, this layer can be configured as a very thin wall or a film wherein the material thickness is approximately 0.3 mm to 3 mm and preferably between 1 mm and 2.5 m.

DESCRIPTION OF THE PREFERRED EMBODIMENTS

Figure 1:
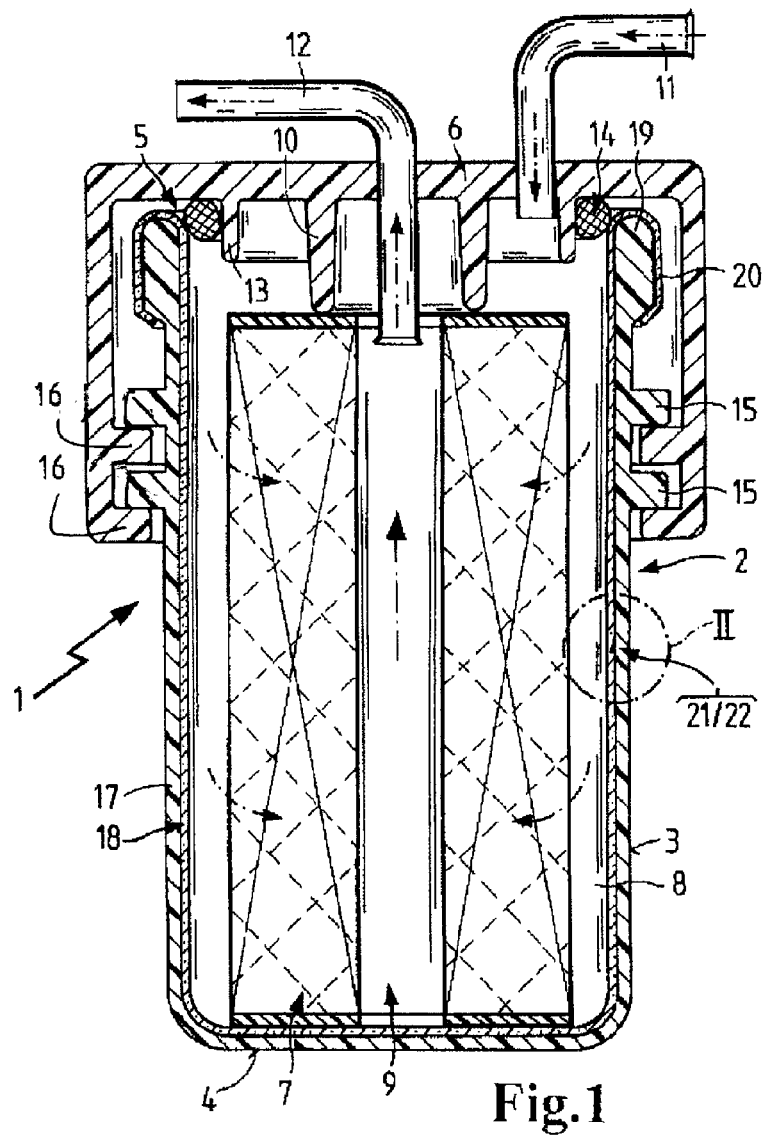
FIG. 1 is a longitudinal section view of a filter according to the invention.

FIG. 1 shows a filter 1 which is comprised of housing 2 with filter element 7 arranged therein. The housing 2 comprises a cylindrical wall 3 with an end wall 4 at one end face; in the illustrated embodiment, the end wall 4 forms the bottom of the housing 2. The upper end of the housing 2 has an open end face 5 that is closed off by a lid 6. For securing the lid 6 on the cylindrical wall 3, there are two radial collars 15 arranged at an axial spacing relative to one another on the cylindrical wall. They engage radial inwardly projecting ribs 16 provided on the inner side of the cylindrical section of the lid 6. The filter element 7 is positioned within the housing 2 in such a way that an outer annular chamber 8 is formed into which the liquid that flows that is being fed in through inlet connector 11 in the lid 6. The filtered liquid exits from the interior 9 through a return connector 12 also provided in the lid 6.

In order to secure the filter element 7 safely in its position, pins 10 are provided on the lid 6 and extend in the axial direction. On the inner side of the lid 6 there is also an annular element 13 that delimits a mounting space for a sealing ring 14 so that the sealing ring 14 contacts three surfaces, i.e., the lid 6, the annual element 13, and the inner layer 18 in the area of the open end face 5. The housing 2 is comprised of an outer layer 17 and an inner layer 18 that are in immediate contact with one another.

Alternatively, it is also possible, inasmuch as the material of the inner layer 18 has sufficient elasticity, to place the inner layer 18 of the housing 2 with appropriate pretension directly against the lid 6 so that the interior of the filter is reliably sealed relative to the exterior. In this way, the sealing ring 14 is not needed.

The outer layer 17 is comprised of plastic material or synthetic material that is significantly harder than the material of the inner layer 18. The material of the outer layer 17 is a thermoplastic material such as polypropylene with 20% talcum. This material has a sufficient stability; resistance to fuel is not required. The material of the inner layer 18 is in particular polyethylene, polyamide or POM. The inner layer is not subjected to significant mechanical loads and can therefore be relatively thin-walled. Inasmuch as a fuel filter is concerned, this material however must be fuel-resistant. In the area of the open end face 5, the outer layer 17 is designed as a bead 19; this bead 19 is covered on the outer side with the material of the inner layer 18 so that a holder 20 is provided.

Figure 2:
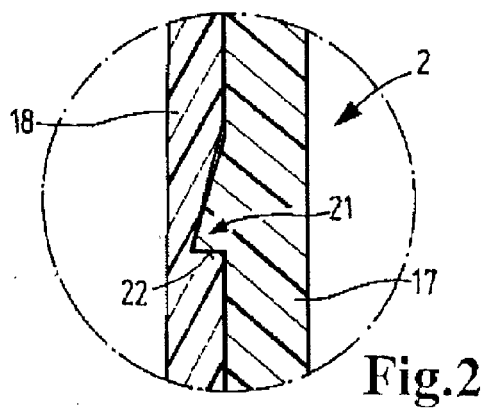
FIG. 2 is a detail view of the detail 11 of FIG. 1.

FIG. 2 shows a detail 11 of FIG. 1. FIG. 2 shows that the housing 2 has elements for a positive-locking connection of the outer layer 17 and the inner layer 18. For this purpose, on the outer layer 17 a radial projection 21 is formed which engages a corresponding groove 22 of the inner layer 18. By this feature, the relative position of the two layers 17, 18 is secured in the axial direction of the housing 2.

In a crash situation, the outer layer 17 breaks under force load because it is comprised of a relatively brittle plastic material. Since the inner layer 18 is comprised of a soft plastic material, it ensures seal tightness. Since fatigue strength and resistance must be provided only up to the point of a crash, the demands on the inner layer concern only short-term resistance and short-term durability. In any case, after a crash situation the filter must be exchanged.

It is within the scope of the invention to configure the housing 2 such that the inner layer 18 is comprised of a hard plastic material and the outer layer 17 is comprised of a soft plastic material. For the hard inner layer 18 polyamide or POM are suitable. The outer soft layer 17 can be comprised of a thermoplastic elastomer material.

The specification incorporates by reference the entire disclosure of German priority document 20 2007 002 785.0 having a filing date of Feb. 22, 2007.

While specific embodiments of the invention have been shown and described in detail to illustrate the inventive principles, it will be understood that the invention may be embodied otherwise without departing from such principles.

What is claimed is:

1. A filter comprising:
    a cup-shaped housing comprised of a cylindrical wall having a first end face and a second end face and further comprised of an end wall closing off the first end face, said end wall having no apertures therethrough;
    a filter insert arranged entirely within the housing;
    a lid as a separate component from said housing and removably attached to the cylindrical wall and closing off the second end face of said housing;
    wherein the housing is comprised of two layers of different plastic materials,
    wherein the different plastic materials have different ductility,
    wherein a first one of said two layers has a greater hardness, said hardness resisting mechanical loads including pressure and vibrations,
    wherein a second one of said two layers is deformable and more elastic than said first layer,
    wherein when the first layer is mechanically damaged in a crash, the elasticity of the second layer provides short-term resistance and durability to said cup-shaped housing,
    wherein the first one of the two layers of the housing is an inner layer and the second one of the two layers is an outer layer,
    wherein the inner layer is made from soft plastic material and the outer layer is made from hard plastic material,
    wherein said inner layer has an open face portion,
    wherein said inner layer extends from a cylindrical inside wall surface of said outer layer then outwardly onto an open face surface of said outer layer, said open face portion of said inner layer facing an end face surface of said lid.

2. The filter according to claim 1, wherein the two layers contact one another immediately.

3. The filter according to claim 1, wherein the cylindrical wall has elements that provide a positive-locking connection of the two layers in an axial direction of the housing.

4. The filter according to claim 3, wherein a first one of the two layers has at least one projection that engages a recess of the second one of the two layers.

5. The filter according to claim 4, wherein the projection is a radial collar and wherein the recess is a radial groove.

6. The filter according to claim 1, wherein the inner layer rests with pretension against the lid.

7. The filter according to claim 1, wherein the inner layer is comprised of polyethylene, polyamide, or POM.

8. The filter according to claim 7, wherein the inner layer is a thin wall or a film and has a material thickness of approximately 0.3 mm to 3 mm.

9. The filter according to claim 8, wherein the material thickness is 1 mm to 2.5 mm.

10. The filter according to claim 1, wherein the inner layer is fuel-resistant.

11. The filter according to claim 1 wherein the outer layer is made from a thermoplastic material.

12. The filter according to claim 1, wherein the housing is an injection-molded product.

13. The filter according to claim 1, wherein the housing is a two-component injection-molded product.

14. The filter according to claim 1, wherein the housing is a blow-molded product.

* * * * *